UNITED STATES PATENT OFFICE.

ARTHUR ASHWORTH AND JOSHUA BÜRGER, OF BURY, ENGLAND.

BROWN DYE.

SPECIFICATION forming part of Letters Patent No. 548,344, dated October 22, 1895.

Application filed December 4, 1893. Serial No. 492,768. (Specimens.)

*To all whom it may concern:*

Be it known that we, ARTHUR ASHWORTH, chemical manufacturer, and JOSHUA BÜRGER, technical chemist, Fernhill Chemical Works, residing at Bury, England, have invented a new and useful Method for the Production of New Coloring-Matters, of which the following is a specification.

The invention consists in combining alpha-amido-beta-naphthol with tannins or gallic acid by means of condensing agents, as is, for instance, fully demonstrated in the following example: 18.800 parts, by weight, of crystallized gallic acid, or seventeen parts, by weight, of dried gallic acid, or 32.200 parts, by weight, of tannin are gradually mixed with two hundred parts, by weight, of concentrated sulphuric acid, 66° Baumé, and when dissolved 15.9 parts, by weight, of alpha-amido-beta-naphthol or 19.600 parts, by weight, of its chlorhydrate are gradually added to the solution, the mass being continuously stirred. After all is dissolved the temperature is raised to 60° to 70° centigrade, kept at that temperature during one hour, then raised in another hour up to 85° to 90° centigrade and kept at that temperature during two further hours, continuously stirring the mass. The reaction being finished, the mass is cooled down and then poured on ice.

The coloring-matters precipitate in yellowish-brown paste, which is filtered off, washed, and kept in a paste or dried.

The coloring-matters when dry form a brownish powder, slightly soluble in cold water, easier soluble in hot water, slightly soluble in cold alcohol, more soluble in hot alcohol, very little soluble in ether, soluble in caustic soda with violet color, changing to brown by agitation and admixture of air, soluble in concentrated sulfuric acid with a crimson-red color. On dilution with ice-water the coloring-matter is precipitated in brownish paste.

The coloring-matters are most suitable for practical purposes in form of a paste, and they produce on chrome mordants brown shades of great fastness to light and soap. An addition of bisulfites to the color-paste improves its usefulness.

What we claim as new is—

1. The process herein described of producing coloring matters, consisting of adding alpha amido beta naphthol to a solution of tannin in a condensing agent, such as sulfuric acid, and heating the resulting mixture, substantially as specified.

2. The new dye consisting of a brownish powder, little soluble in cold water, easier soluble in hot water, slightly soluble in cold alcohol, more soluble in hot alcohol, little soluble in ether, soluble in caustic soda with violet color changing into brown on agitation and admixture of air, soluble in concentrated sulfuric acid with a crimson red color, on dilution with ice water precipitating in a brownish paste, producing on chrome mordants brown shades substantially as described.

ARTHUR ASHWORTH.
JOSHUA BÜRGER.

Witnesses:
ARTHUR C. HALL,
JOHN W. THOMAS.